(12) United States Patent
Halalay

(10) Patent No.: US 7,722,994 B2
(45) Date of Patent: May 25, 2010

(54) LITHIUM-ION BATTERY NON-AQUEOUS ELECTROLYTES

(75) Inventor: Ion C. Halalay, Grosse Pointe, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 465 days.

(21) Appl. No.: 11/692,399

(22) Filed: Mar. 28, 2007

(65) Prior Publication Data

US 2008/0241699 A1  Oct. 2, 2008

(51) Int. Cl.
*H01M 6/16* (2006.01)
(52) U.S. Cl. ...................... 429/324; 429/326
(58) Field of Classification Search ................ 429/324, 429/326
See application file for complete search history.

(56) References Cited

U.S. PATENT DOCUMENTS

| | | | |
|---|---|---|---|
| 5,219,683 A * | 6/1993 | Webber ....................... 429/330 |
| 5,830,600 A * | 11/1998 | Narang et al. ............... 429/326 |
| 6,246,508 B1 * | 6/2001 | Yde-Andersen et al. .... 359/270 |
| 2001/0053474 A1 * | 12/2001 | Oura et al. .................. 429/137 |
| 2004/0126665 A1 * | 7/2004 | Sun ............................ 429/303 |
| 2007/0082271 A1 * | 4/2007 | Abe et al. .................... 429/331 |

FOREIGN PATENT DOCUMENTS

| CN | 1921041 A | | 2/2007 |
|---|---|---|---|
| WO | WO 2005048391 A1 | * | 5/2005 |
| WO | 2007/010833 A1 | | 1/2007 |

* cited by examiner

*Primary Examiner*—Dah-Wei D Yuan
*Assistant Examiner*—Stephan Essex

(57) ABSTRACT

A rechargeable lithium-ion battery includes an anode, a cathode and an electrolyte containing one or more dispersed lithium salts. The electrolyte is composed of one or more solvent materials. A principal solvent constituent compound is at least one of γ-valerolactone, methyl isobutyryl acetate, 2-methoxyethyl acetate, 2-ethoxyethyl acetate, and diethyl oxalate.

25 Claims, 2 Drawing Sheets

LITHIUM-ION BATTERY NON-AQUEOUS ELECTROLYTES

TECHNICAL FIELD

The present invention relates to lithium-ion batteries.

BACKGROUND OF THE INVENTION

Rechargeable lithium-ion batteries are widely used for portable battery applications and may find uses in larger size batteries for stationary and transportation applications. Lithium is a light element that is highly electropositive (−3 volts versus standard hydrogen electrode). The electropositive property may be utilized to provide a battery with a high open circuit voltage. Further, batteries based on light lithium metal or lithium-based alloy as the active anode material can provide a relatively high level of electrical energy per unit weight or per unit volume of the battery.

There are different embodiments of rechargeable lithium-ion batteries. One embodiment includes an anode comprising lithium metal or a lithium alloy within its structure or composition. This battery further comprises a non-aqueous, lithium-ion containing electrolyte and a cathode comprising, for example, $Li_xMO_2$, where M is a transition metal such as cobalt nickel, or manganese. During charging of this battery element combination, lithium ions are removed from the cathode material as the oxidation state of the transition metal component (M) of the cathode increases. Lithium ions are inserted in the cathode during reduction at the cathode (cell discharging) as the oxidation state of the transition metal component is lowered. As stated, these electrochemical cells offer relatively high voltage and high energy density performance.

The electrolyte in a lithium-ion cell may be liquid, comprising a non-aqueous solvent in which solid lithium salts, such as lithium hexafluorophosphate ($LiPF_6$), are dissolved in an organic solvent, for example ethylene carbonate or propylene carbonate.

In order to be suitable for automotive applications, lithium batteries need performance features that exceed the requirements for small-scale battery applications in consumer electronics and portable computers. For example, they must produce suitable electrical power over a wide temperature range, including quite low temperatures. Automotive applications of lithium-ion batteries would benefit from electrolyte materials contributing to such performance features.

SUMMARY OF THE INVENTION

Suitable solvents for lithium-ion battery electrolytes, especially for on-vehicle applications, preferably have all the following properties: sufficient solubility for a specified lithium salt(s) to be used in the electrolyte; chemical stability in the presence of such lithium salt(s); a large electrochemical stability window (typically >4 V); low temperature melting point ($\theta_M$<−20° C.); relatively low viscosity ($\eta$<4 cP, more than 4 cP if and only if permittivity, $\epsilon_r$>20); high temperature boiling point ($\theta_B$>+100° C.); above ambient flash point ($\theta_{FL}$>+37° C.); low vapor pressure (typically <1 Torr at ambient temperature); suitable ratings for health and flammability; and low cost.

Five substantially water-free solvent compounds for lithium-ion battery electrolytes with improved low-temperature performance have been evaluated with lithium hexafluorophosphate ($LiPF_6$) as the lithium salt for the electrolyte and have been found to combine the above listed property requirements. These solvent compounds are γ-valerolactone, methyl isobutyryl acetate, 2-methoxyethyl acetate, 2-ethoxyethyl acetate, or diethyl oxalate. These compounds may be used individually as the electrolyte solvent. They may be used in mixtures with each other, and/or in mixtures with other materials to form a suitable electrolyte composition for a lithium-ion battery application. But, in accordance with this invention, one or more of these five compounds is intended to be the principal constituent of the electrolyte solvent. For example, a suitable lithium salt, such as lithium hexafluorophosphate, is dissolved in at least one of these compounds at a suitable concentration, such as about 0.5 molar to about 1 molar concentration, to form the electrolyte for a lithium-ion battery. These compounds have been found to perform well in lithium-salt containing electrolytes.

In accordance with a preferred embodiment of the invention, one or more of the five above-identified ester compounds is the principal constituent of the electrolyte solvent, making up at least fifty percent by volume of the electrolyte solvent and, preferably, ninety to ninety-five percent by volume of the electrolyte solvent. However, one or more of these principal solvent components may be used, for example, in combination with one or more carbonate compound solvents to achieve, for example, a preferred overall solvent electrical conductivity or viscosity for battery performance. Examples of suitable carbonate solvents include ethylene carbonate, propylene carbonate, dimethyl carbonate, diethyl carbonate, and ethyl methyl carbonate. The addition of minor amounts of a carbonate solvent may, for example, promote the formation of a desirable solid electrolyte interface (SEI) on electrode surfaces. In other embodiments, the principal solvent constituent may be used in combination with a gel or polymeric component in the electrolyte space, but at least one of the named compounds is the principal solvent constituent for the lithium salt(s). And, the principal solvent constituent may include suitable flame retardant additives or the like.

Accordingly, in one embodiment of the invention, a lithium-ion battery may comprise a lithium metal containing anode, a non-aqueous electrolyte consisting essentially of a lithium salt dissolved at a suitable concentration in one or more of the above-listed five solvent compounds, and a cathode that functions with the anode and electrolyte.

Other objects and advantages of the invention will become more apparent from a detailed description of embodiments of the invention which follows.

DESCRIPTION OF PREFERRED EMBODIMENTS

Figure 1:
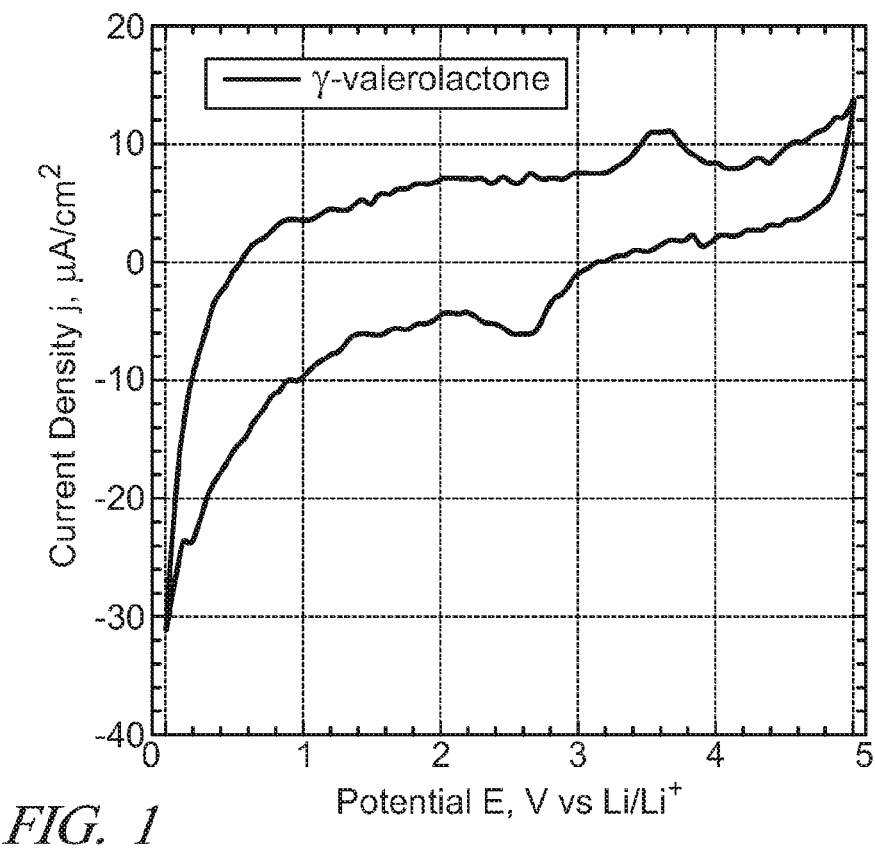
FIG. 1 is a cyclic voltammogram (current density j, μA/cm$^2$ versus potential E, V vs. Li/Li$^+$) recorded with a platinum working electrode and lithium foil counter and reference electrodes for one molar $LiPF_6$ in gamma-valerolactone.

An electrolyte for a lithium-ion battery is provided that includes a lithium salt and an improved solvent composition. In one embodiment of the invention the lithium salt may be lithium hexafluorophosphate ($LiPF_6$). In another embodiment, the lithium salt may comprise at least one of a lithium fluorophosphate, a lithium borate, a lithium imide, a lithium fluoroalkylphosphate, or a lithium salt with fluorinated anions. Examples of these lithium salts include lithium hexafluorophosphate ($LiPF_6$), lithium tetrafluoroborate ($LiBF_4$), lithium bis(oxalate)borate, $LiN(SO_2CF_3)_2$, $LiN(SO_2C_2F_5)_2$, or $Li(C_2F_5)PF_3$.

The lithium salt is often used in a concentration of about 0.5 M to about 1.5 M. The solvent includes a principal constituent which is at least one of γ-valerolactone, methyl isobutyryl acetate, 2-methoxyethyl acetate, 2-ethoxyethyl acetate, or diethyl oxalate. The principal constituent comprises at least fifty percent by volume of the solvent. In another embodiment, the principal constituent may comprise about ninety to about ninety-five percent by volume of the electrolyte solvent. The solvents are stable with dissolved lithium salts, such as lithium hexafluorophosphate, and in contact with metallic lithium-containing anodes. The electrolytes including at least one solvent provide suitable conductivity at temperatures as low as −30° C.

The five solvent compounds were tested in the following experiments. The first set of experiments examined the solubility of the solvent compounds for the $LiPF_6$ salt and the electrochemical stability window of the solvents. One molar solutions of $LiPF_6$ of each of the solvents were prepared so as to minimize the oxygen and water contents of the solutions. The electrolyte solutions were prepared in argon atmosphere in a dry-box with oxygen contents lower than one part-per-million. During the preparation of the electrolyte solutions the temperature in the dry-box ranged from 27° C. to 29° C. The $LiPF_6$ salt used, available from Stella Chemifa Corporation, Japan, had a purity of 99.99% and a water content of 20 ppm. The purity of the as-received solvents varied from better than 99% to better than 90%. The water content of the as-received solvents did not exceed 0.1%, and anhydrous solvents were used whenever available. All of the solvents were dried over molecular sieves inside a dry-box.

All electrical measurements were performed with 3-electrode cells that defined an internal shallow round cylindrical electrolyte volume (22.2 mm diameter, 3 mm high) of 1.2 mL. The working electrode consisted of a 99.99% half-hard platinum wire with a diameter of 1 mm (0.7 $cm^2$ area) that was placed along a cylinder diameter in the center plane of the cell electrolyte space. The counter electrode and the reference electrode constituted upper and lower bases of the cylindrical space; each was made of a metallic lithium foil and had an area of 4 $cm^2$. A 3 mm layer of electrolyte separated the working and counter electrodes. Reference and counter electrodes were connected to the measuring circuit via nickel current collectors ending in 2.5 mm banana jacks, while the working electrode connections were effected by silver-plated mini-alligator clips. Cyclic potential scans were performed with an Arbin multi-channel 3-electrode battery cycler. All the channels of the Arbin cycler were calibrated with a Keithley 2001 DMM prior to each series of measurements.

Referring now to FIG. 1, a cyclic voltammogram for the solvent γ-valerolactone is provided. The cyclic voltammogram was recorded with a platinum working electrode and lithium metal foil counter and reference electrodes for one molar $LiPF_6$ in γ-valerolactone. The electrical potential was cycled between zero volts and five volts.

The initial electrolyte color was water-white and was unchanged by contact with metallic aluminum or by the cyclic potential scans. The peak, visible in FIG. 1, at 3.6 volts corresponds to the formation of a platinum hydroxide layer due to oxidation of residual water. The peak at 2.6 V is due to the reduction of platinum oxide.

As seen in FIG. 1, current densities are smaller than 30 $\mu A/cm^2$ over the whole five volt range of the potential scan, indicating a low concentration of electrochemical active impurities. This electrolyte solvent, γ-valerolactone, has a very wide electrochemical stability window, equal to or greater than five volts, and is chemically stable towards metallic lithium and the $LiPF_6$ salt.

Figure 2:
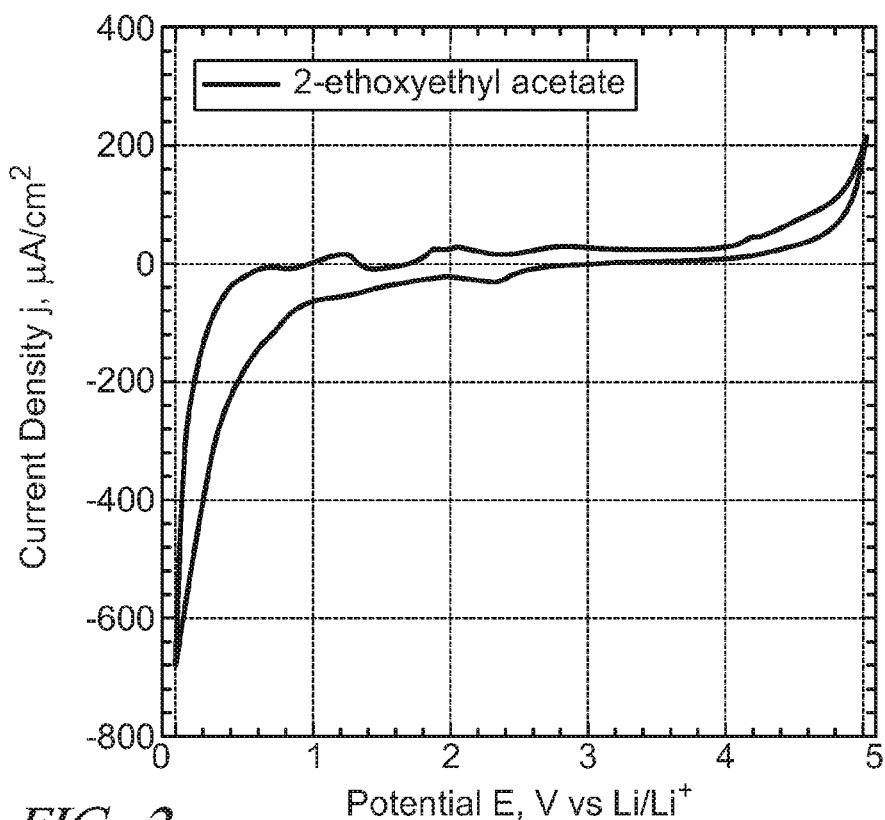
FIG. 2 is a cyclic voltammogram (current density j, μA/cm$^2$ versus potential E, V vs. Li/Li$^+$) recorded with a platinum working electrode and lithium foil counter and reference electrodes for one molar $LiPF_6$ in 2-ethoxyethyl acetate.

Referring now to FIG. 2, a cyclic voltammogram for the solvent 2-ethoxyethyl acetate is provided. The cyclic voltammogram was recorded with a platinum working electrode and lithium metal foil counter and reference electrodes for one molar $LiPF_6$ in 2-ethoxyethyl acetate. The electrical potential was cycled between zero volts and five volts.

The initial electrolyte color was very faint and was unchanged by contact with metallic aluminum or by the cyclic potential scans. The very small oxidation peaks at 1.2 V, 2.0 V, and 2.8 V, and the reduction peak at 2.3 V are due to a small amount of residual organic impurities. The solvent does not contain any water.

Solvent decomposition of the solvent 2-ethoxyethyl acetate due to oxidation starts at 4.0 V, but current density exceeds 100 $\mu A/cm^2$ only above 4.7 V. Solvent decomposition due to reduction occurs below 0.8 V. This solvent 2-ethoxyethyl acetate has an electrochemical stability window of about 4.3 V and is chemically stable towards metallic lithium and the $LiPF_6$ salt.

These two cyclic voltammetric experiments and results are representative of like data also obtained with the solvents methyl isobutyryl acetate, 2-methoxyethyl acetate, and diethyl oxalate. Each of these solvents proved to be chemically stable towards metallic lithium and the $LiPF_6$ salt in like electrical potential cycling tests.

Another set of experiments examined the specific conductivity for 1 M electrolyte solutions of $LiPF_6$. Two-electrode cells with blocking electrodes were used for electrical ac impedance measurements. The cells provided a shallow round cylindrical electrolyte space, as described above, with a volume of 1.2 mL and facing nickel electrodes at upper and lower bases of the cylindrical electrolyte space. The measuring surfaces of all electrodes were polished to a mirror-like finish with aqueous alumina suspensions having decreasing particle sizes of 6 μm, 1 μm, 0.3 μm and 0.050 μm. Prior to assembly, all cell components were cleaned with methanol in an ultrasonic cleaner, rinsed twice with distilled water and dried under vacuum.

Electrical ac impedance spectra were collected with a Solartron 1260 frequency response analyzer (FRA) at frequencies 100 Hz≦f≦10 MHz, using a four-terminal-pair (also known as virtual ground) measurement connection. The ac voltage amplitude ranged from 0.12 V to 3.0 V, depending on the value of the electrolyte resistance to be measured. A Tenney Jr. temperature chamber fitted with an access port for coaxial cables was used for temperature control. The set-point stability of the Tenney Jr chamber was ±0.1° C. throughout the temperature range of −50° C. to +40° C.

The respective solutions of solvents were tested and found to yield the following specific electrical conductivities at room temperature (about 20° C.): γ-valerolactone 6.0 mS/cm, methyl isobutyryl acetate 4.8 mS/cm, 2-methoxyethyl acetate 4.6 mS/cm, 2-ethoxyethyl acetate 3.6 mS/cm, and diethyl oxalate 3.0 mS/cm. By comparison, the specific electrical conductivity of propylene carbonate, an organic carbonate widely used for lithium-ion battery electrolytes, at room temperature is 5.3 mS/cm.

Figure 3:
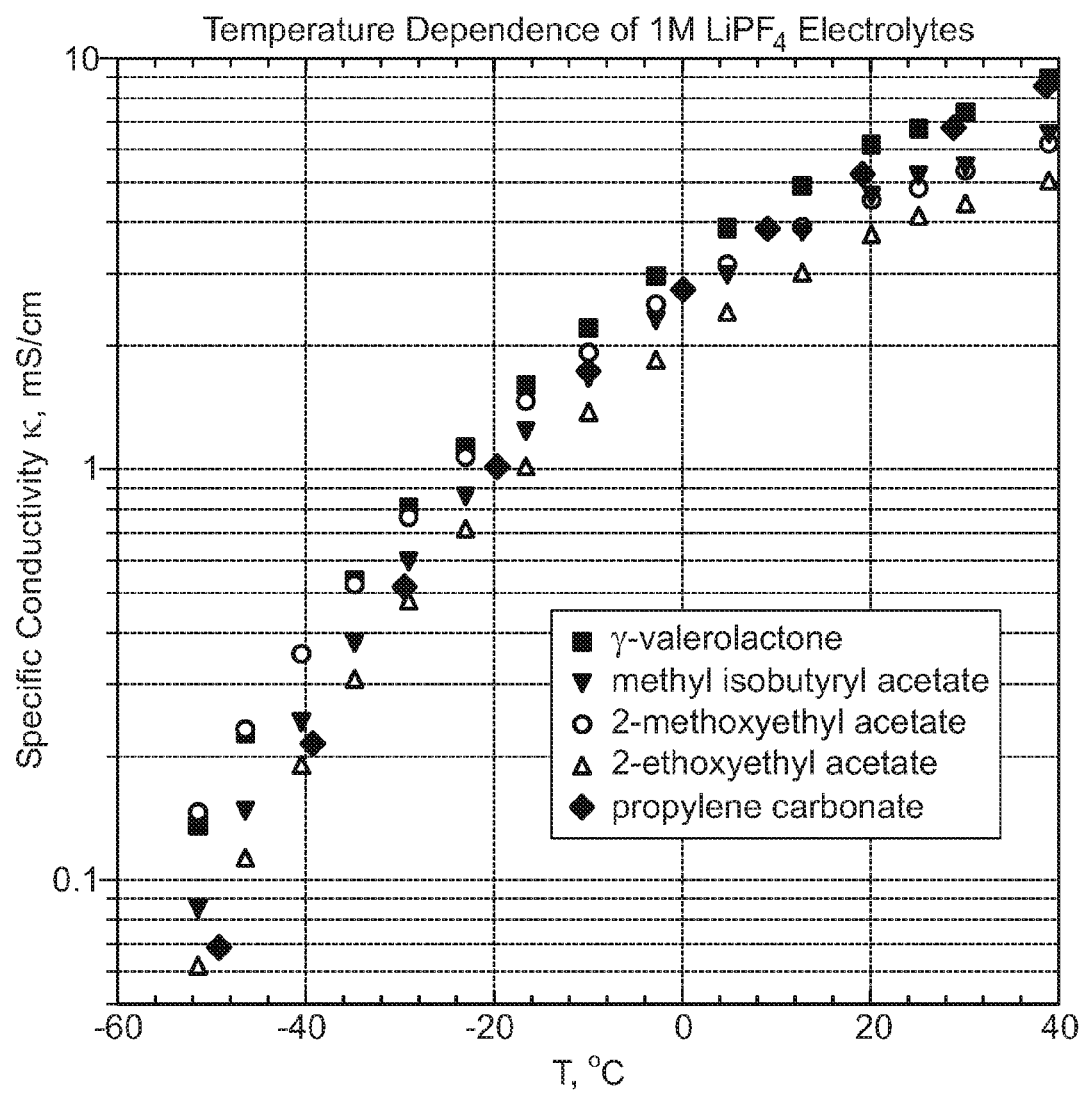
FIG. 3 is a graph illustrating the temperature dependence of the specific conductivity (κ, in mS/cm) for 1M $LiPF_6$ solutions in five solvent compounds.

Referring now to FIG. 3, a graph is presented which illustrates the temperature dependence of the specific conductivity (mS/cm) for 1M $LiPF_6$ solutions in four of the solvents (γ-valerolactone, 2-methoxyethyl acetate, 2-ethoxyethyl acetate, and methyl isobutyryl acetate), and, as a prior art comparison, in propylene carbonate. Propylene carbonate is a solvent known in the art for use in lithium-ion battery electrolytes. Electrolyte mixtures (lithium hexafluorophosphate dissolved in the respective solvent compounds) of γ-valerolactone, 2-methoxyethyl acetate, 2-ethoxyethyl acetate, and methyl isobutyryl acetate are seen to provide specific conductivity values comparable to or better than values provided by propylene carbonate. As seen in the data of FIG. 3, the solvents γ-valerolactone, methyl isobutyryl acetate, and 2-methoxyethyl acetate may be particularly suitable for low temperature use and have better electrical conductivity than organic carbonate solvents in wide use for lithium-ion battery electrolyte formulations. For example, these three solvents have better low temperature performance than propylene carbonate. Referring to FIG. 3, γ-valerolactone yields a higher specific conductivity than propylene carbonate over the entire temperature interval of −50° C. to +40° C. Also as seen in FIG. 3, γ-valerolactone, 2-methoxyethyl acetate, and methyl isobutyryl acetate perform better than propylene carbonate at temperatures lower than 0° C.

Accordingly, γ-valerolactone, methyl isobutyryl acetate, 2-methoxyethyl acetate, 2-ethoxyethyl acetate, and diethyl oxalate are considered suitable for use as principal solvent constituents in lithium salt-containing electrolytes in a lithium-ion battery having an anode that includes lithium metal or a lithium alloy. These principal solvent constituents may be used as the sole solvent in the electrolyte, in mixtures with each other, or in mixtures with minor proportions of one of more other solvent(s). The other solvents may be other electrolyte solvents for lithium salts in lithium-ion batteries, for example ethylene carbonate, propylene carbonate, dimethyl carbonate, diethyl carbonate, or ethyl methyl carbonate.

The subject solvent compounds are used as the principal electrolyte solvent in a lithium-ion battery including an anode, a cathode, and an electrolyte including a lithium salt. It is expected that one or more of the principal solvent constituents may comprise about ninety to about ninety-five percent by volume of the solvent material for one or more selected lithium salts.

In one embodiment, one or more of the principal solvent constituents may be used in a mixture with a carbonate solvent such as ethylene carbonate. The ethylene carbonate may function as a film-forming component on an electrode. The film, called "solid electrolyte interphase" (SEI), is electronically insulating and ionically conducting, and it helps to prevent battery self-discharge. In another embodiment, when at least one principal solvent constituent and at least one other solvent constituent are mixed, low temperature performance with higher electrical conductivities may be achieved. The other solvent constituents dimethyl carbonate, diethyl carbonate, or ethyl methyl carbonate may function as low viscosity components that further improve electrical conductivity at low temperatures.

In still another embodiment of the invention, the anode may include at least one of lithium metal, a lithium alloy, or a carbonaceous material. The cathode may include at least one of a transition metal oxide, a doped transition metal oxide, a mixture of transition metal oxides, a metal phosphate, lithium iron phosphate, or a metal sulfide. The lithium salt in the lithium-ion battery may include at least one of a lithium fluorophosphate, a lithium borate, a lithium imide, a lithium fluoroalkylphosphate, or a lithium salt with fluorinated anions. The lithium salt may include at least one of lithium hexafluorophosphate (LiPF$_6$), lithium tetrafluoroborate (LiBF$_4$), lithium bis(oxalate)borate, LiN(SO$_2$CF$_3$)$_2$, LiN(SO$_2$C$_2$F$_5$)$_2$, or Li(C$_2$F$_5$)PF$_3$. The concentration of the lithium salt may be about 0.5 molar to about 1.5 molar. In another embodiment of the invention, the lithium-ion battery may further include a suitable amount of flame retardant, for example a phosphate solvent or a phosphonate solvent.

In still another embodiment of the invention, the lithium-ion battery may include a gel-forming conductive polymer to occupy a portion of the electrolyte space and contain (like a sponge) the liquid electrolyte. The gel-forming conductive polymer may formed of polymers such as, poly(acrylonitrile), poly(methyl methacrylate), or poly(ethylene oxide).

The above description of certain embodiments of the invention is merely exemplary in nature and, thus, variations, modifications and/or substitutions thereof are not to be regarded as a departure from the spirit and scope of the invention.

The invention claimed is:

1. An electrolyte for a lithium-ion battery comprising a lithium salt and a solvent, wherein the solvent comprises methyl isobutyryl acetate, the methyl isobutyryl acetate comprising at least fifty percent by volume of the solvent.

2. An electrolyte as set forth in claim 1 wherein the methyl isobutyryl acetate comprises about ninety to about ninety-five percent by volume of the solvent.

3. An electrolyte as set forth in claim 1 wherein the lithium salt comprises at least one of a lithium fluorophosphate, a lithium borate, a lithium imide, a lithium fluoroalkylphosphate, or a lithium salt with fluorinated anions.

4. An electrolyte as set forth in claim 1 wherein the lithium salt comprises at least one of lithium hexafluorophosphate, lithium tetrafluoroborate, lithium bis(oxalate)borate, LiN(SO$_2$CF$_3$)$_2$, LiN(SO$_2$C$_2$F$_5$)$_2$, or Li(C$_2$F$_5$)PF$_3$.

5. An electrolyte as set forth in claim 1 wherein the concentration of the lithium salt is about 0.5 molar to about 1.5 molar.

6. An electrolyte as set forth in claim 3 wherein the concentration of the lithium salt is about 0.5 molar to about 1.5 molar.

7. An electrolyte as set forth in claim 4 wherein the concentration of the lithium salt is about 0.5 molar to about 1.5 molar.

8. An electrolyte as set forth in claim 1 wherein the solvent further comprises at least one of γ-valerolactone, 2-methoxyethyl acetate, 2-ethoxyethyl acetate, or diethyl oxalate.

9. An electrolyte as set forth in claim 1 wherein the solvent consists essentially of methyl isobutyryl acetate.

10. An electrolyte as set forth in claim 1 further comprising a flame retardant dispersed in the electrolyte, wherein the flame retardant comprises at least one of a phosphate solvent or a phosphonate solvent.

11. An electrolyte as set forth in claim 1 wherein the solvent further comprises a carbonate, which is at least one of propylene carbonate, ethylene carbonate, dimethyl carbonate, diethyl carbonate, or ethyl methyl carbonate.

12. An electrolyte as set forth in claim 1 wherein the electrolyte is contained within a gel-forming conductive polymer.

13. A lithium-ion battery comprising:
    an anode;
    a cathode; and
    an electrolyte comprising a lithium salt dispersed in a solvent, wherein the solvent comprises methyl isobutyryl acetate, the methyl isobutyryl acetate comprising at least fifty percent by volume of the solvent.

14. A lithium-ion battery as set forth in claim 13 wherein the methyl isobutyryl acetate comprises about ninety to about ninety-five percent by volume of the solvent.

15. A lithium-ion battery as set forth in claim 13 wherein the anode comprises at least one of lithium metal, a lithium alloy, or a carbonaceous material.

16. A lithium-ion battery as set forth in claim 13 wherein the lithium salt comprises at least one of a lithium fluorophosphate, a lithium borate, a lithium imide, a lithium fluoroalkylphosphate, or a lithium salt with fluorinated anions.

17. A lithium-ion battery as set forth in claim 13 wherein the lithium salt comprises at least one of lithium hexafluorophosphate, lithium tetrafluoroborate, lithium bis(oxalate)borate, $LiN(SO_2CF_3)_2$, $LiN(SO_2C_2F_5)_2$, or $Li(C_2F_5)PF_3$.

18. A lithium-ion battery as set forth in claim 13 wherein the concentration of the lithium salt is about 0.5 molar to about 1.5 molar.

19. A lithium-ion battery as set forth in claim 16 wherein the concentration of the lithium salt is about 0.5 molar to about 1.5 molar.

20. A lithium-ion battery as set forth in claim 17 wherein the concentration of the lithium salt is about 0.5 molar to about 1.5 molar.

21. A lithium-ion battery as set forth in claim 13 wherein the solvent further comprises at least one of γ-valerolactone, 2-methoxyethyl acetate, 2-ethoxyethyl acetate, or diethyl oxalate.

22. A lithium-ion battery as set forth in claim 13 wherein the solvent consists essentially of methyl isobutyryl acetate.

23. A lithium-ion battery as set forth in claim 13 further comprising a flame retardant, wherein the flame retardant comprises at least one of a phosphate solvent or a phosphonate solvent.

24. A lithium-ion battery as set forth in claim 13 wherein the electrolyte further comprises a carbonate, which is at least one of propylene carbonate, ethylene carbonate, dimethyl carbonate, diethyl carbonate, or ethyl methyl carbonate.

25. An electrolyte for a lithium-ion battery comprising a lithium salt and a solvent, wherein the solvent comprises methyl isobutyryl acetate.

* * * * *